UNITED STATES PATENT OFFICE.

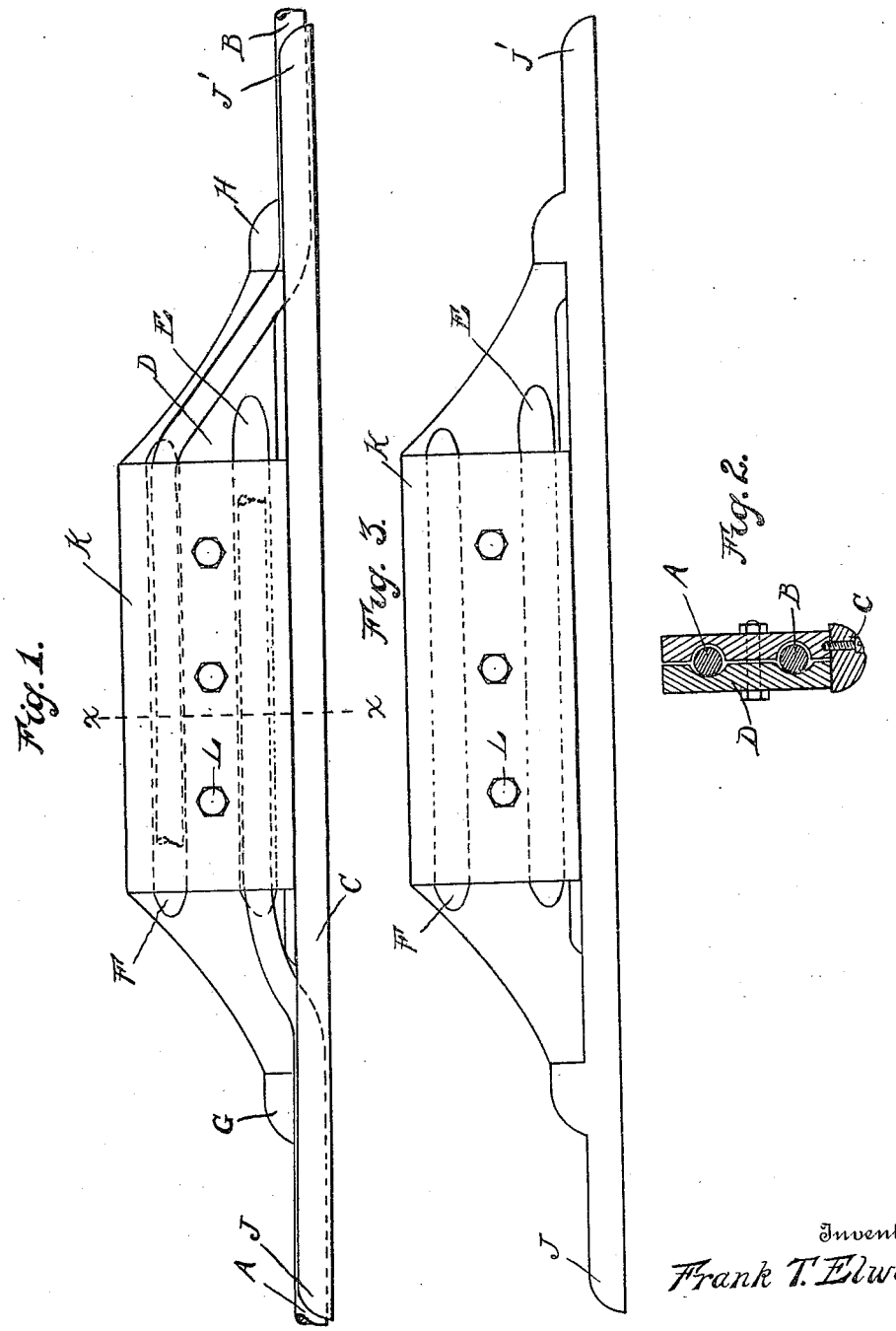

FRANK T. ELWELL, OF LOS ANGELES, CALIFORNIA.

TROLLEY-SPLICER.

1,272,783.  Specification of Letters Patent.  Patented July 16, 1918.

Application filed December 2, 1916. Serial No. 134,637.

*To all whom it may concern:*

Be it known that I, FRANK T. ELWELL, a citizen of the United States of America, residing at Los Angeles, in the county of Los Angeles and State of California, have invented certain new and useful Improvements in Trolley-Splicers, of which the following is a specification, reference being had therein to the accompanying drawings.

This invention relates to trolley devices and refers more particularly to an improved construction of trolley splicer.

Among the objects of the invention are to provide a trolley splicer in which the ends of the wire to be spliced can be overlapped and an equal gripping tension placed on each of the ends; to provide a construction in which the ends of the wire are both held by the same clamping mechanism, preferably of the type known as the three bolt clamp; to provide a construction in which the clamping portion is not subjected to the wear of the trolley wheel, there being a protecting plate or other member for taking the wear of the wheel; to provide means for holding down the trolley wire at a point removed from the plate member so as to prevent crystallizing of the wire at the point of securement; and in general to provide a new and improved splicer for holding the ends of a trolley wire or the like.

In the drawings:

Figure 1 is a side elevational view of a trolley splicer embodying my invention;

Fig. 2 is a vertical cross section on the line x—x of Fig. 1;

Fig. 3 is a side elevational view showing a slightly modified construction.

Describing in detail the particular construction shown in the drawings, A and B designate the ends of the trolley wires which are to be secured in place. Extending beneath the wires is a plate member C having its ends grooved so as to form U-shaped seats for the ends A and B of the trolley wires. This guard member which receives the wear of the trolley wheel is preferably formed separate from the splicer plate D, as shown in Fig. 1, although it could be formed integral therewith, as shown in Fig. 3.

The splicer plate D is provided with grooves E and F within which extend the overlapping ends A and B of the trolley wires. Near its outer end the plate member D is provided with locking projections G and H which fit over the trolley wires.

It will be noticed that these locking projections G and H are located inwardly a considerable distance from the ends J and J' of the plate member C. Therefore as the trolley wheel approaches the splicer if there is any tendency to lift the wire upward the bend will come at the portion beneath the locking projections G and H while the blow of the trolley wheel will come upon the ends J and J' of the projecting plate member C. This arrangement will prevent the crystallizing of the wire which would occur if the blow of the trolley wheel came upon the portion of the wire that is held fixedly in place.

After the ends of the wire have been extended into the grooves E and F they are clamped into locking engagement by a plate K, through which extend bolts L. As both wires are held by the same clamping plate which is preferably of the three bolt type, there will be an equal clamping tension upon each of the wires. Moreover any wear caused by the trolley wheel will not affect the splicer since the clamping portions are entirely protected by the underlying plate member C, and in case the detachable member is employed the guard plate can be removed without affecting the clamping action of the trolley splicer.

What I claim as my invention is:

1. The combination with wires to be spliced, of a trolley splicer, comprising a grooved member adapted to receive the ends of the wires in overlapping relation, and a clamping plate for holding the wires in the grooves, and means for securing said clamping plate to produce an equal gripping tension on both of the wires.

2. The combination with wires to be spliced, of a trolley splicer, comprising a grooved member adapted to receive the ends of the wires in overlapping relation, a permanent clamping plate for holding the wires in the grooves, and means independent of the clamping plate for taking the wear of the trolley wheel.

3. The combination with wires to be spliced, of a trolley splicer, comprising a grooved member adapted to receive the ends of the wires in overlapping relation, a clamping plate for holding the wires in the grooves and a protecting plate member positioned below the clamping plate.

4. The combination with wires to be spliced, of a trolley splicer, comprising a grooved member adapted to receive the ends of the wires in overlapping relation, a clamping plate for holding the wires in the grooves and a protecting plate member positioned below the clamping plate, said protecting plate member having grooved portions extending beneath the wires.

In testimony whereof I affix my signature.

FRANK T. ELWELL.

Copies of this patent may be obtained for five cents each, by addressing the "Commissioner of Patents, Washington, D. C."